United States Patent

Owens et al.

[15] 3,643,611
[45] Feb. 22, 1972

[54] PLANTING APPARATUS

[72] Inventors: Edwin G. Owens; Joseph J. Wiley, Jr., both of Summerville, S.C.

[73] Assignee: Westvaco Corporation, New York, N.Y.

[22] Filed: Nov. 13, 1969

[21] Appl. No.: 876,491

[52] U.S. Cl. ................................111/2, 172/166, 172/491
[51] Int. Cl. .................................................A01c 11/02
[58] Field of Search ...........................111/2, 3; 172/491, 166

[56] References Cited

UNITED STATES PATENTS

| | | | |
|---|---|---|---|
| 1,475,061 | 11/1923 | Frawley | 111/2 |
| 2,003,390 | 6/1935 | Poll et al. | 111/3 |
| 2,799,234 | 7/1957 | Chancey | 111/3 |
| 2,944,495 | 7/1960 | Wilson et al. | 111/2 |
| 3,125,044 | 3/1964 | Kolk | 111/2 |
| 3,379,147 | 4/1968 | Cochran | 111/2 |
| 3,508,411 | 4/1970 | Rogers | 172/491 X |

Primary Examiner—Robert E. Pulfrey
Assistant Examiner—R. T. Rader
Attorney—Ernest B. Lipscomb, Robert S. Grimshaw and T. Russell Foster

[57] ABSTRACT

Apparatus for setting plants such as tree seedlings into the ground including a planter frame having a front end arranged to be attached to a tractor for freely pivotal movement in a vertical plane by means including a support frame and having a rear end supported on earth compacting means in front of which are supported on the planter frame, furrow-forming means and a plant-setting device, the planter frame being arranged to follow the contour of the ground during its forward movement independently of the support frame on which an operator is supported for manually feeding plants to the plant-setting device.

11 Claims, 8 Drawing Figures

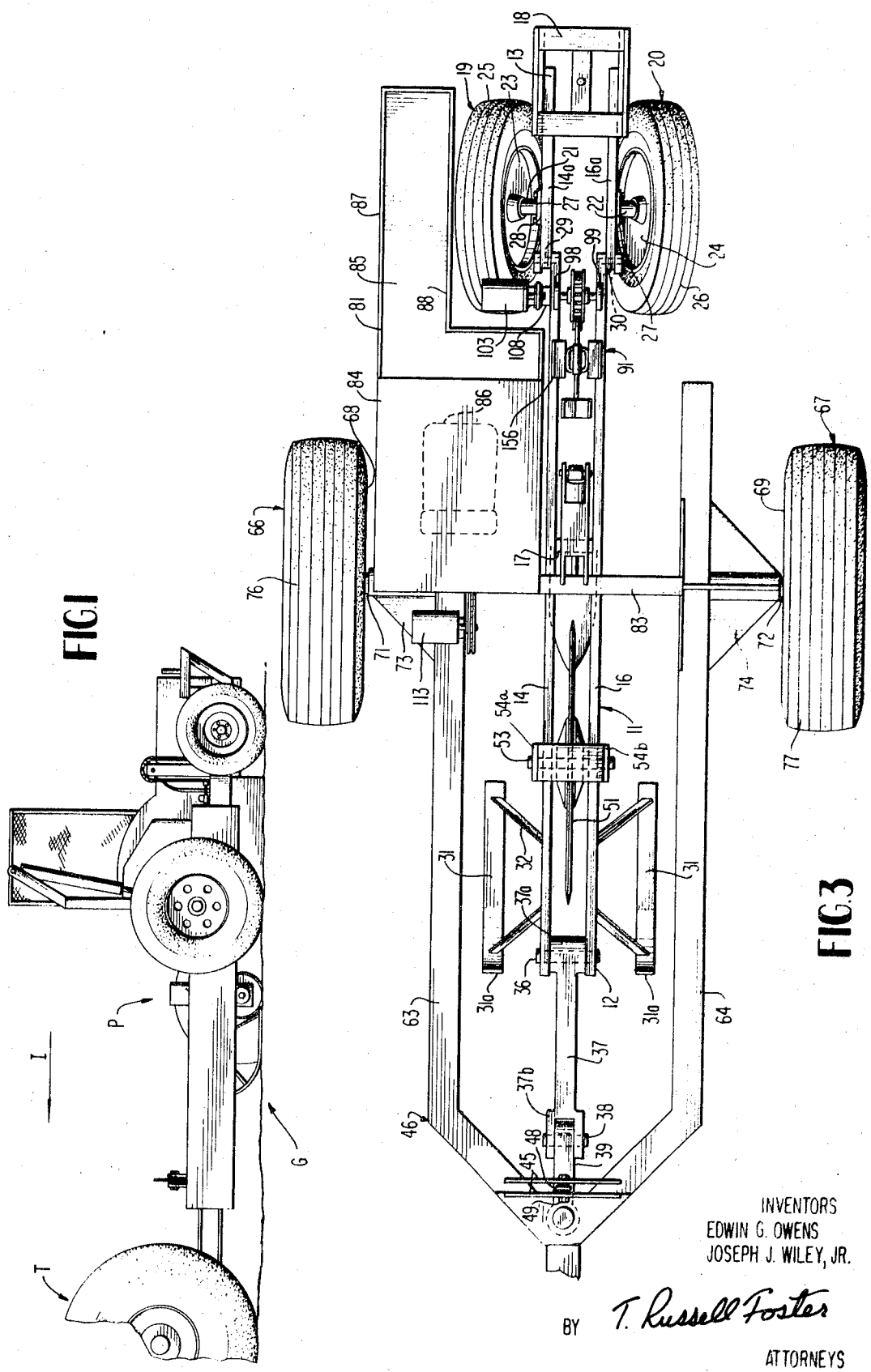

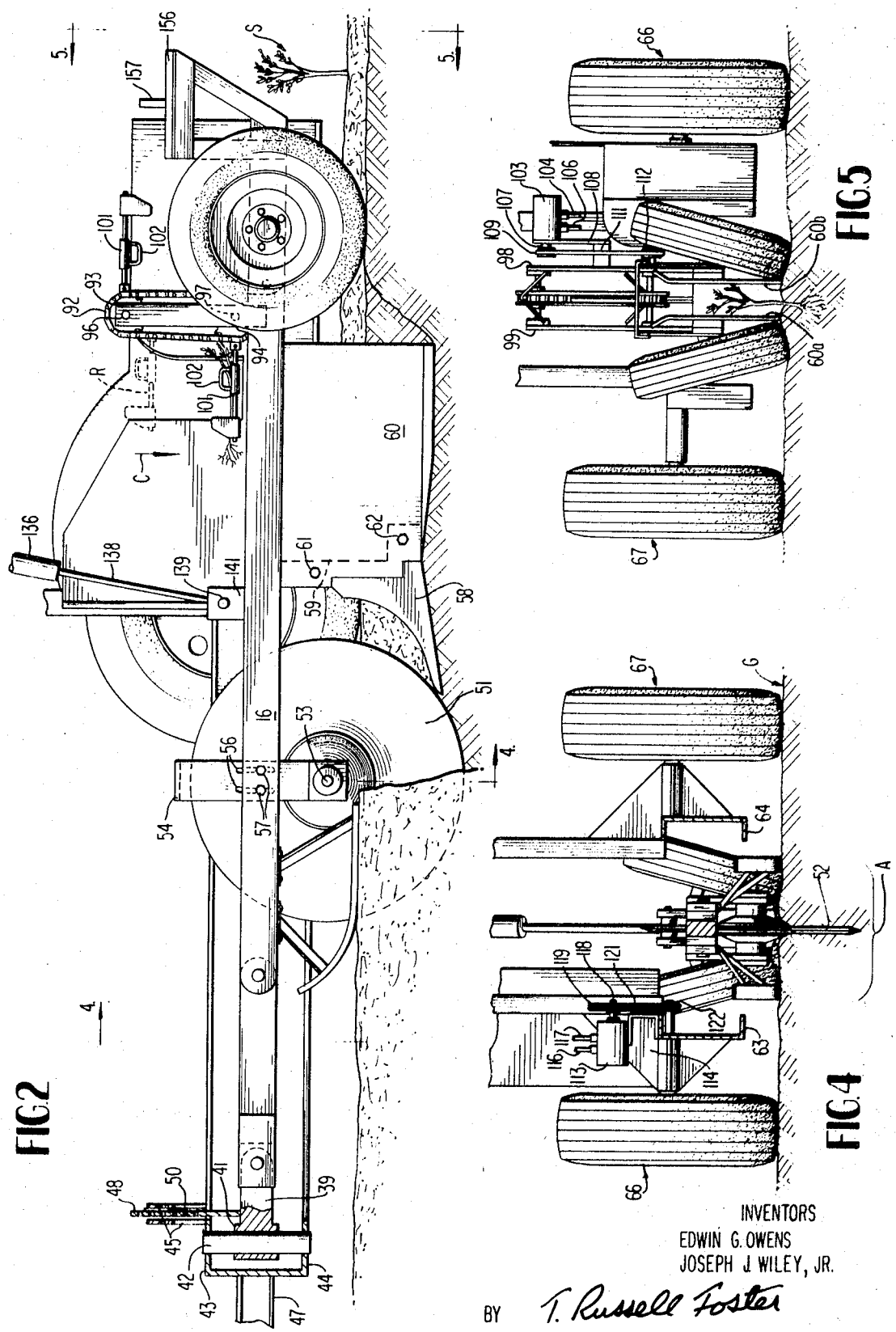

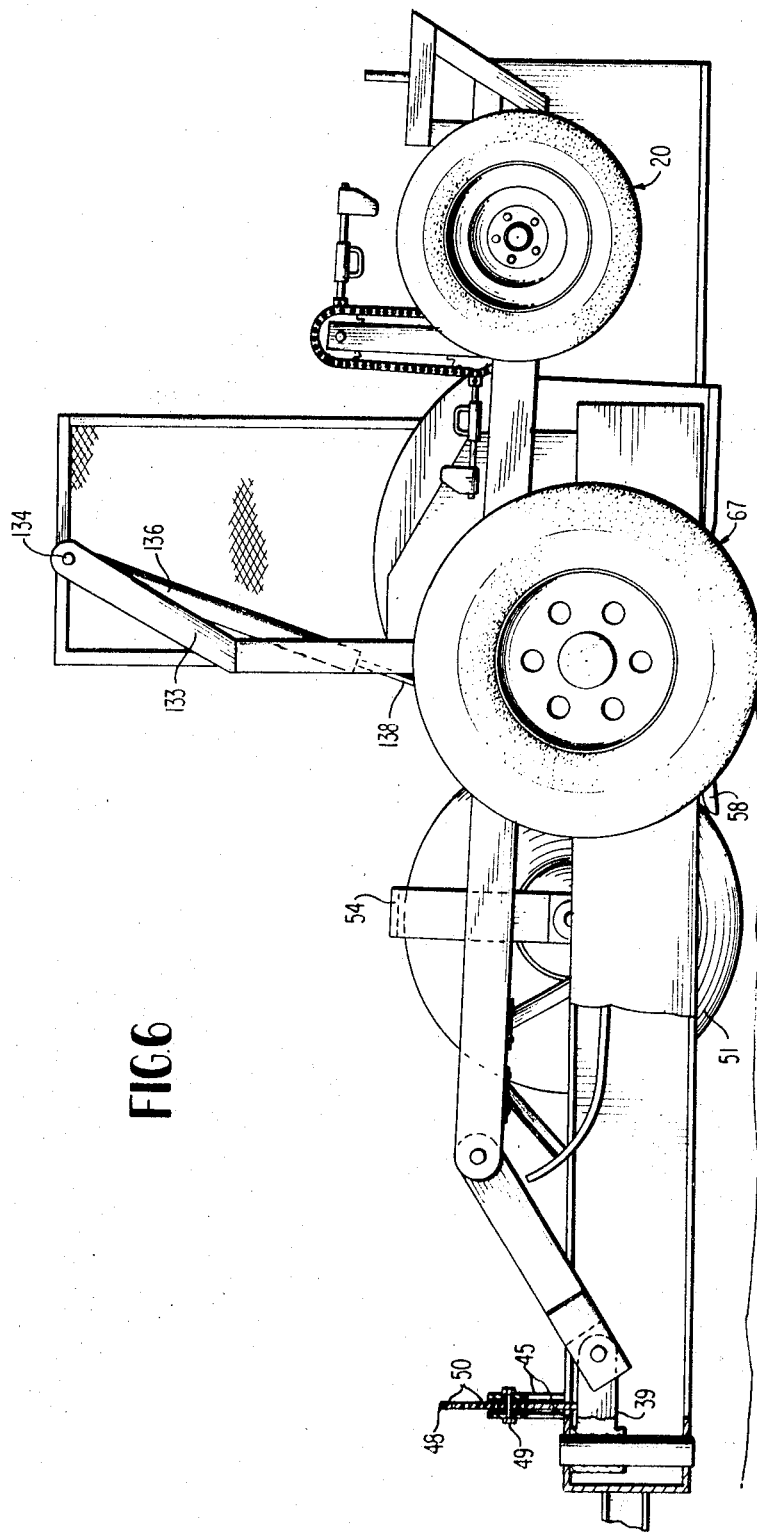

3,643,611

PLANTING APPARATUS

It has long been recognized that where large numbers of plants such as tree seedlings are to be set into the ground such as in the regeneration of tree stands, planting by machine is by far the most practical technique from the standpoint of both time and labor involved. Such mechanical planters have been proposed in the past and are in use today, present-day planters being preferably of the type arranged for attachment to a prime mover such as a tractor or the like. In addition, present-day planting machines are generally of the type which includes an arrangement for supporting one or more operators. It is generally recognized that the feeding of plants such as seedlings to the planting machine during a plant-setting operation can be best accomplished manually by an operator supported on the planter due to the variety of shapes and sizes of such plants or seedlings and the need for segregating the individual plants for planting as well as the need for uninterrupted planting of a large number of plants over a wide area for the sake of economy, proper growth and easy harvesting.

Such mechanical planting utilizing present-day machines often fails to produce the desired results in that the continuously varying contour of the typical ground in which the plants are set severely limits the ability of such machines to set plants at a uniform depth in the ground and in a uniform spaced-apart relationship. This is particularly true in the planting of tree seedlings where the land is not as level as farm land which has been worked at regular intervals over long periods of time and where the seedlings are to be set in prepared beds where the earth is usually quite soft. This failure of such machines to follow the contour of the area to be planted is also due to the hitching arrangements by means of which such machines are connected to the pulling unit such as a tractor. As a result of the present-day coupling devices or hitches for attaching the planting machine to the tractor, the tendency of the planting machine to follow the contour of the area planted is restrained so that further variation from the desired planting depth for the plants or seedlings occurs. Additional planting problems are encountered with present-day machines in addition to inserting a plant such as a seedling into the ground at the proper depth. For instance, some degree of precision is required in the formation of a continuous trench or furrow in the ground of the proper width and depth prior to insertion of the plant into the furrow as well as in the subsequent filling of the furrow with earth so as to pack the earth around the roots of the inserted plants carefully and with the absence of voids. Only limited success has been obtained with the present-day machines in such furrow-forming and earth-packing operations. There is, of course, the additional problem of setting plants such as seedlings into the ground in prepared beds in which the earth is relatively soft as control of the planting depth in such soft beds is difficult to maintain.

As has been referred to above, the common practice in present-day planting machines is to provide a suitable operator-supporting device such as a seat on the machines in a position such that the operator is able to insert the plants into the plowed furrow or to feed plants into a suitable plant-setting device carried on and driven by the machine. In addition to the physical hazards presented to such an operator riding on the planting machine, the operator's weight further adds to the problem of maintaining the machine at the proper height for planting as well as for efficiently performing the other machine operations such as trenching, plant-setting, trench-filling and earth-compacting. In those present day machines in which mechanical plant setting devices are not employed, the operator-rider performs the setting of plants in the plowed trench manually. The hazards incident to such manual planting-setting operation are readily apparent as the operator generally is required to occupy a dangerous position on the machine such as a forwardly facing squatting position and must manipulate his hands around portions of the machine so that personal injury is difficult to avoid and there is exposure of the operator to violent and hazardous jolts when ground obstacles are encountered as well as excessive operator fatigue after only a short period of operation.

Accordingly, a primary object of this invention is to provide a new and novel apparatus for setting plants such as tree seedlings into the ground.

Another object of this invention is to provide a new and novel planting apparatus for attachment to a tractor such that the apparatus is permitted to closely follow the contour of the area to be planted regardless of the variation in the condition of the ground.

A further object of this invention is to provide a new and novel planting apparatus for setting plants such as seedlings into the ground which permits the plants to be set into the ground at the proper depth and which packs earth around the planted seedling in a firm, void-free manner.

Still another object of this invention is to provide a new and novel planting apparatus for planting tree seedlings in a highly efficient manner and at a high rate of speed under the most adverse terrain conditions, which permits the planting of such seedlings in a uniform manner and at selected spacing between seedlings throughout a wide range irrespective of the ground speed of the apparatus, which is simple and rugged in construction and low in initial cost and which is capable of prolonged use with a minimum of maintenance.

A still further object of this invention is to provide a new and novel planting apparatus for plants such as tree seedlings utilizing a mechanical plant-setting device into which the seedlings are properly inserted manually by an operator supported in a safe and comfortable position completely independent of the planting components of the invention.

Still another object of this invention is to provide a new and novel planting apparatus for setting tree seedlings into the ground utilizing a mechanical, manually fed plant-setting device driven at a selected speed through a fluid pressure system which additionally provides for moving the planting components of the invention between an elevated traveling position and a floating-planting position.

Other objects and advantages of the invention will become apparent from the following description taken in connection with the accompanying drawings.

In general, the object of this invention and other related objects are accomplished by providing a planter frame for setting plants into the ground having a front end and a rear end supported on earth compacting means for forward movement of the frame along the ground. Means including a support frame are provided for pivotally attaching the front end of the planter frame to a prime mover such as a tractor and furrow-forming means are supported on the planter frame between the planter frame front end and earth-compacting means to form a furrow in which a plant such as a tree seedling is deposited by a plant-setting device supported on the planter frame between the furrow-forming means and the earth-compacting means. The plant-setting device is arranged to be driven at a selected speed corresponding to the speed of the tractor by means of a hydraulic system and is arranged to be manually fed with plants by an operator supported independently of the planter frame on a support frame attached to the tractor for forward movement together with the planter frame.

The novel features which are believed to be characteristic of the invention are set forth with particularity in the appended claims. The invention itself, however, both as to its organization and method of operation may be best understood by reference to the following description taken in conjunction with the accompanying drawings in which:

FIG. 1 is a side elevation view of the planting apparatus of the invention;

FIG. 2 is an enlarged side elevation view partially broken away of the planting apparatus of FIG. 1 performing a planting operation;

FIG. 3 is an enlarged plan view of the planting apparatus of FIG. 1;

FIG. 4 is a sectional view taken substantially along line 4—4 of FIG. 2 in direction of the arrows;

FIG. 5 is an end view taken substantially along line 5—5 of FIG. 2 in the direction of the arrows;

FIG. 6 is an enlarged side elevation view of the planting apparatus of FIG. 1 illustrating the apparatus in the traveling position;

Figure 7:
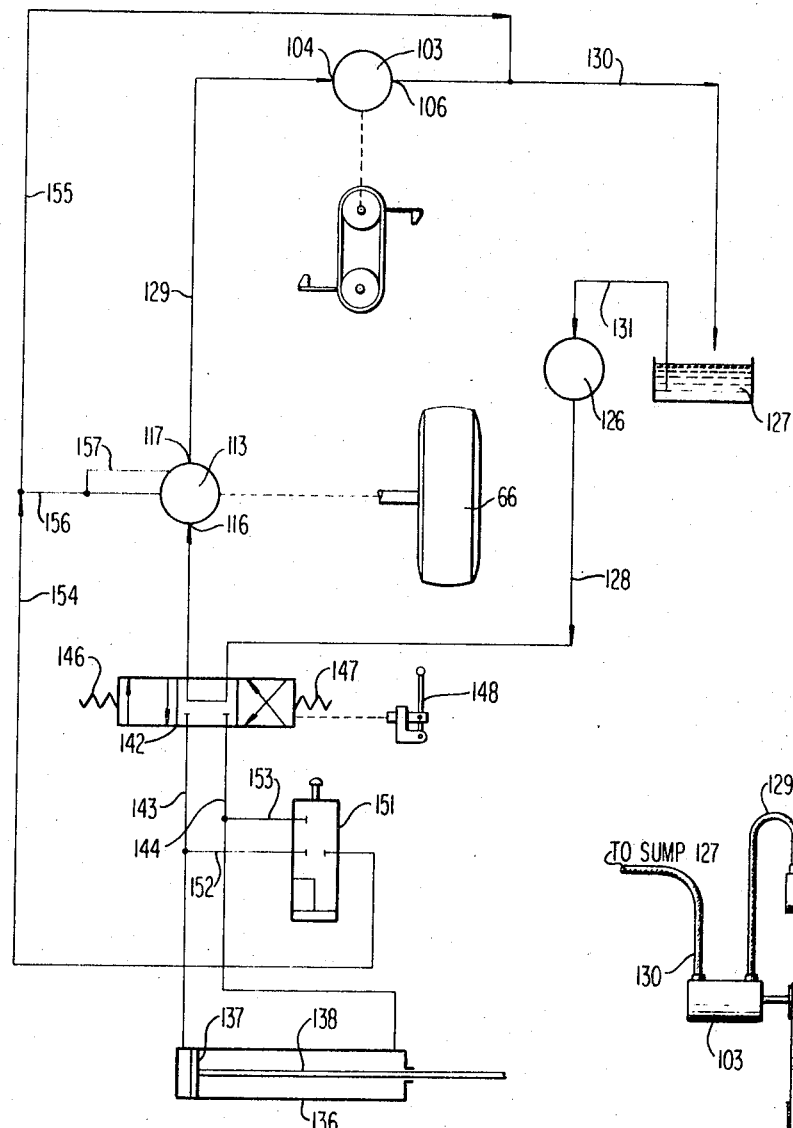
FIG. 7 is a schematic diagram of the hydraulic system incorporated in the planting apparatus of the invention.

Referring now to the drawings, there is shown in FIG. 1 a planting apparatus constructed in accordance with the invention which is designated generally by the letter P. The planting apparatus P is used for the purpose of setting plants such as tree seedlings into the ground, designated generally by the letter G, a seedling planted by the invention being shown in FIG. 2 and designated generally by the letter S. The planting apparatus P is of the type which is arranged to be attached to a prime mover such as a tractor, a portion of which is shown in FIG. 1 and designated generally by the letter T. It should be understood that any suitable hitching arrangement may be employed for connecting the planting apparatus P to the tractor T, the tractor hitch being omitted in the drawings for clarity.

The planting apparatus P may be used to set plants such as seedlings S in suitably prepared areas such as bedded land, disced land or the like and is particularly suitable for the planting of tree seedlings in large areas generally referred to as "tree farms" for creating or regenerating woodlands for pulp wood, etc. The planting apparatus P is arranged to be moved forwardly in the direction of the arrow 1 of FIG. 1 by the prime mover or tractor T along the ground G over a planting area such as a plant bed or the like, the planting area being designated generally in FIG. 4 by the letter A. As will be explained hereinafter, the tree seedlings S are set by the planting apparatus P into the planting area A at uniformly space intervals in a longitudinally extending row.

As specifically illustrative of the invention, the planting apparatus P includes a planter frame designated generally by the numeral 11 having a front end 12 and a rear end 13 as shown best in FIG. 3. In the illustrated embodiment, the planter frame 11 includes a pair of elongated frame members 14, 16 which are interconnected in spaced-apart parallel relationship by means such as a cross member 17, a weight-supporting device 18 mounted on the frame rear end 13 and various other parts of the planting apparatus P.

Earth-compacting means are provided on the rear end 13 of the planter frame 11 for supporting the planter frame rear end for forward movement along the ground G and for compacting the plowed earth of the planting area A around the planted seedlings S. More specifically, a pair of compacting wheels 19, 20 are provided which are preferably of the type which includes axles 21, 22, rims 23, 24 on which are mounted rubber tires 25, 26 respectively. In the preferred embodiment, the compacting wheels 19, 20 are arranged for vertical adjustment by the provision of mounting plates 27 on which the wheel axles 21, 22 are mounted and which are arranged to be secured in a selected vertical position to rear end portions 14a, 16a of frame members 14, 16 respectively by means of bolts 28. In the preferred embodiment, the inner ends of frame member portions 14a, 16a are pivotally mounted on the frame members 14, 16 by means of pivot pins 29, 30 for downward pivotal movement of the compacting wheels 19, 20. Mutually engaging, arcuate surfaces, as shown in FIG. 2, are provided on the interconnected ends of the portions 14a, 16a and the frame members 14, 16 for limiting the upward pivotal movement of the wheels 19, 20, the arcuate surfaces being arranged for interlocking engagement in the horizontally aligned position of the portions 14a, 16a, and members 14, 16.

In the illustrated embodiment, ground-engaging means are provided for supporting the front end 12 of the planter frame 11 for forward movement of the planter frame along the ground G over a planting area A in which the earth is soft to serve as an aid in maintaining the planter frame at the desired height for planting. However, it should be understood that for many types of planting areas particularly where the ground is relatively hard, such ground-engaging means are not required.

As shown best in FIG. 3, skids or runners 31 are provided for slidably engaging the planting area A and the skids 31 are mounted on legs 32 secured to the frame members 14, 16 by bolts or the like adjacent the planter frame front end 12. Each of the skids 31 is preferably provided with an upturned, arcuate front end 31a so as to permit the skids to slide smoothly over any obstructions in the planting area A during the forward movement of the planter frame 11.

Means are provided for pivotally attaching the planter frame front end 12 to the tractor T for freely pivotal movement of the planter frame front end in a substantially vertical plane as the planter frame 11 is moved forwardly over the planting area A. More specifically, in the preferred embodiment, a transversely extending pivot pin 36 is mounted in the front ends of the frame members 14, 16 and one end 37a of a link member 37 pivotally attached to the pin 36. The other end of the link member 37 is bifurcated to form a yoke 37b in which is mounted a transversely extending pivot pin 38. The yoke 37b, forming the forward end of the link member 37, is pivotally connected by means of the pivot pin 38 to one end of a coupling 39, the other end of which is provided with a vertically extending sleeve portion 41 preferably formed integrally therewith.

The sleeve portion 41 of the coupling 39 is mounted telescopically on a pin 42 for freely slidable, vertical movement as shown best in FIG. 2. In the illustrated embodiment, the pin 42 is secured at its ends to vertically spaced plates 43, 44 suitably mounted on a support frame designated generally by the numeral 46 as will be more fully described hereinafter. The support frame 46 includes a forward extension 47 for attaching the support frame 46 to the tractor hitch (not shown) with the planter frame 11 attached to the support frame by means of the link member 37 and associated parts.

In planting areas where the earth is particularly soft, it may be desirable to lock the coupling 39 in a selected vertical position relative to the pin 42 to prevent planting at an excessive depth. This is accomplished by the provision of a pair of plates 45 having apertures mounted on the upper plate 43 through which extends an upstanding bar 48 having apertures 50 the lower end of which is attached to the coupling 39. The coupling 39 may therefore be secured in a selected vertical position by means of a bolt 49 which extends through the plates 45 into the selected aperture 50 in the bar 48.

Furrow-forming means are supported on the planter frame 11 between the planter frame front end 12 and the earth compacting means or packing wheels 19, 20. More specifically, a downwardly extending, freely rotatable disc coulter 51 is provided which is arranged to form a slot 52 in the earth of the planting area A as shown in FIG. 4 during the forward movement of the planter frame 11. The coulter 51 is rotatably mounted on an axle 53 supported on a U-shaped support bracket 54 extending between the frame members 14, 16.

In the preferred embodiment, means are provided for adjusting the vertical position of the coulter 51. More specifically, the leg portions 54a, 54b of the support bracket 54 are provided with vertically extending slots 56 which are arranged to accommodate bolts 57 extending through suitable openings in the frame members 14, 16. Thus the coulter 51 may be moved to a selected vertical position by adjustment of the position of the support bracket 54 as permitted by the slots 56 and clamped in the adjusted position by means of the bolts 57.

The furrow forming means also include a downwardly depending plow 58 as shown best in FIG. 2 mounted on a support plate 59 suitably positioned on the planter frame 11 between the coulter 51 and the packing wheels 19, 20. Preferably the plow 58 together with the support plate 59 is mounted for vertical adjustment on the forward end portion of a downwardly depending trough member 60 suitably secured to the frame members 14, 16. The support plate 59 with the plow 58 thereon is retained in the adjusted vertical position by means of bolts 61, 62 arranged to engage vertically spaced apertures (not shown) in the plate 59.

The support frame 46 is operatively associated with the planter frame 11 and means engageable with the ground G adjacent the planting area A are provided for supporting the support frame 46 for forward movement by the tractor T in the direction of the arrow I together with the planter frame 11. In the illustrated embodiment, the support frame 46 is of substantially U-shaped configuration and includes frame portion 63, 64 extending in laterally spaced, substantially parallel relationship with opposite sides of the planter frame 11. Means are provided for connecting the support frame 46 to the prime mover or tractor T and, as has been explained, the forward end of the support frame 46 is provided with the extension 47 for connection to the tractor hitch, the forward ends of the frame portions 63, 64 being suitably interconnected by means such as welding or the like adjacent the vertically spaced plates 43, 44.

The supporting means for the support frame 46 include a pair of wheels 66, 67 having rims 68, 69 mounted on axles 71, 72 rotatably supported in bearing brackets 73, 74 suitably mounted on the frame portions 63, 64 respectively of the support frame 46. The wheels 66, 67 are preferably of the type which are provided with rubber tires 76, 77 mounted on the rims 68, 69 respectively.

Operator-supporting means are provided on the support frame 46 which include a housing 81 supported adjacent the frame member 14 of the planter frame 11 by means which include an upstanding, transversely extending framework 83 of inverted, U-shaped configuration, the lower ends of which are suitably mounted on the support frame portions 63, 64. The housing 81 preferably includes a canopy 84, a floor plate 85 having a seat 86 supported thereon and sidewalls 87, 88 for accommodating an operator to permit the operator to ride backwards during the forward movement of the planter frame 11 and support frame 46 and to position the operator adjacent a plant-setting device supported on the planter frame 11 and designated generally by the numeral 91.

The plant-setting device 91 includes an endless chain 92 supported for continuous advance on sprocket means which include a pair of vertically spaced sprockets 93, 94 mounted for rotation on shafts 96, 97 supported on upstanding, spaced brackets 98, 99 secured at their lower ends to the frame members 14, 16 respectively of the planter frame 11. A plurality of outwardly projecting plant carrying arms are mounted on the chain 92 in uniformly spaced, longitudinally extending relationship, two of such arms 101 being provided in the illustrated embodiment. The arms 101 include a pair of side members 102 which are yieldingly urged into an open, spaced-apart relationship as shown best in FIG. 5. Any suitable well-known type of plant-carrying arm 101 may be utilized in the planting apparatus of the invention and, by way of example, the plant-carrying arm shown in U.S. Pat. No. 2,739,548 performs satisfactory in the novel arrangement of the invention.

Cam means are provided on the planter frame 11 for camming the side members 102 together into plant-holding relationship. More specifically, the cam means include the downwardly depending trough member 60, which, as has been explained, is secured to the planter frame 11 adjacent the plow 58. The trough member 60 includes sidewalls 60a, 60b arranged in spaced parallel relationship for engaging the side members 102 of the arms 101 as will be explained hereinafter.

Figure 8:
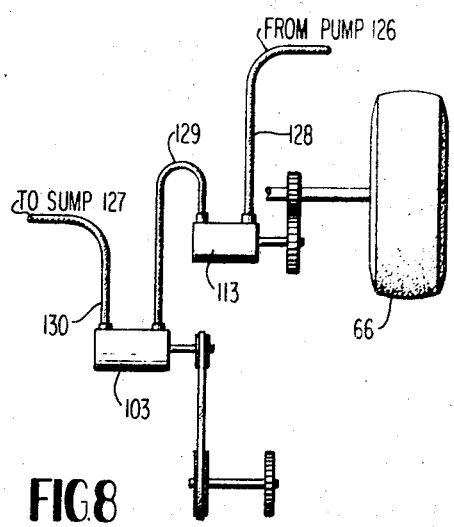
FIG. 8 is a diagrammatic view of a portion of the hydraulic system of FIG. 7.

Means are provided for driving the plant-setting device 91 to continuously advance the chain 92 together with the plant-carrying arms 101 which, in the illustrated embodiment, include a hydraulic system shown diagrammatically in FIGS. 7, 8. More specifically, the hydraulic system includes a hydraulic motor 103 having an inlet 104, an outlet 106, and an output shaft 107 and is mounted by suitable means such as a bracket 108 on the frame member 14 of the planter frame 11. As shown best in FIG. 5, the hydraulic motor output shaft 107 is provided with a pulley 109 connected by means of a belt 111 to a pulley 112 mounted on the shaft 97 of the lower sprocket 94 over which the chain 92 extends.

The hydraulic system also includes a hydraulic pump 113 which is preferably supported on the support frame 46 by means such as a bracket 114 as shown in FIG. 4 and which is provided with an inlet 116, an outlet 117 and an input shaft 118. A sprocket 119 is mounted on the pump shaft 118 and is connected by means of a chain 121 to a sprocket 122 mounted on the axle 71 of the support frame wheel 66, as shown in FIGS. 3, 4. Means are provided for supplying a hydraulic fluid to the hydraulic pump 113 which, in the illustrated embodiment, includes a hydraulic pump 126 suitably mounted on the prime mover or tractor T and preferably arranged to be driven by the power source (not shown) incorporated in the tractor. It should be understood, however, that any suitable arrangement may be utilized for providing a supply of hydraulic fluid to the pump 113 such as a receptacle filled with hydraulic fluid and mounted on the planting apparatus P.

Referring now to FIGS. 7, 8, the pump 126 on the tractor T is connected by means of a fluid pressure conduit 128 to the inlet 116 of the pump 113. The hydraulic system of the invention also includes a fluid pressure conduit 129 which communicates the outlet 117 of the pump 113 with the inlet 104 of the hydraulic motor 103 for conducting pressurized fluid from the pump 113 to the motor 103 for driving the chain 92 on which the plant-carrying arms 101 are supported at a speed determined by the ground speed of the planting apparatus P as reflected by wheel 66 together with the preset ratio of the sprockets 119, 122 through which the pump 113 is driven as well as by the ratio of the pulleys 109, 112 driven by the motor 103. With this arrangement, the seedlings S are set in the planting area A in a predetermined, uniformly spaced relationship irrespective of ground speed.

The hydraulic system of the planting apparatus P also preferably includes a fluid reservoir 127 connected by means of conduit 130 with the outlet 106 of the motor 103 and to the pump 126 on the tractor T by means of conduit 131 as shown in FIG. 7. The fluid reservoir 127, which is also preferably mounted on the tractor T, is for the purpose of supplying makeup fluid to compensate for leakage and to dissipate heat in the hydraulic system.

The planting apparatus P also includes means for moving the planter frame 11 between a floating, planting position as shown in FIG. 3 and a traveling position as shown in FIG. 6. More specifically, a support arm 133 is provided which is preferably mounted on the transversely extending framework 83. One end of a downwardly depending, fluid pressure cylinder 136 is pivotally mounted at 134 on the upper end of the arm 133 as shown best in FIG. 6. The cylinder 136 includes a piston 137 having a rod 138 connected pivotally at its lower end to the planter frame 11 by means of a pivot pin 139 supported between spaced brackets 141 as shown in FIg. 2.

Means are provided for connecting the hydraulic fluid supply means selectively with opposite sides of the piston 137 in the cylinder 136 to move the planter frame 11 between the planting and traveling positions of FIGS. 2, 6 respectively. More specifically, a manually operated four-way, three-position valve 142 is provided which is connected to the conduit 128 and to a pair of conduits 143, 144 communicating with the cylinder 136 on opposite sides of the piston 137 as shown in FIG. 7.

The valve 142 is biased into the normally closed, center position of FIG. 7 by means of springs 146, 147 in which position communication between the conduit 128 and the conduits 143, 144 is interrupted. The valve 142 is arranged to be manually moved against the urging of the respective spring to either the right or left as viewed in FIG. 7 by the manually operated lever 148. Thus, movement of the valve 142 to the right permits pressurized fluid to flow from conduit 128 through conduit 144 to the underside of piston 137 in cylinder 136 to move the piston 137 into an uppermost position as shown in FIG. 7 to elevate the planter frame 11 into the traveling position shown in FIG. 6, conduit 143 forming a return conduit for fluid on the other side of piston 137.

Movement of the valve 142 to the left as viewed in FIG. 7, permits pressurized fluid to flow from conduit 128 through conduit 143 to the top side of piston 137 in cylinder 136 moving the piston 137 to the right as viewed in FIG. 7 and lowering the planter frame 11 into the planting position of FIG. 2, conduit 144 forming the return conduit for fluid.

The means for connecting the hydraulic fluid supply means to the cylinder 136 also preferably includes float control valve means for maintaining the piston 137 in a floating condition in the cylinder 136. More specifically, a two-way, manually actuated valve 151 is provided which is connected to the conduits 143, 144 by means of conduits 152, 153 respectively and which, in the position shown in FIG. 7, permits pressurized fluid to flow through conduits 143, 144 for moving the piston 137 in the selected direction as explained above. Movement of the valve 151 upwardly as viewed in FIG. 7 connects conduits 152, 153 to a conduit 154 and permits the hydraulic fluid to circulate freely within the conduits 143, 144, 152, and 153 between the valve 151 and the cylinder 136 to achieve a floating condition for the piston 137 and consequently for the planter frame 11. At the same time, in this upper position of valve 151, conduits 151, 153 communicate through valve 152 with the conduit 154 to bleed off hydraulic fluid if excessive fluid pressure develops to the float control hydraulic system. Conduit 1154 is arranged to communicate with the reservoir 127 through a conduit 155 connected to conduit 130 as shown in FIG. 7.

It should be understood, however, that if desired, the two-way valve 151 may be incorporated in the valve 142 so that the valve 142 is provided with four rather than three positions thereby eliminating the separate float control valve 151. The combining of valve 142 and 151 into a unitary valve would therefore require releasable remaining means such as a detent for maintaining the valve in the float position.

In order to prevent reverse rotation of the chain 92 which would move the plant-carrying arms 101 in the opposite direction from that of normal operation as described above the pump 113 is arranged to pump pressurized fluid to the motor 103 during forward movement of the planting apparatus P and of the pump-driving wheel 66. Rotation of the wheel 66 in the opposite direction drives the pump 113 to pump hydraulic fluid to the reservoir 127 through a conduit 156 connected to a suitable outlet port in the pump 113 and to return conduit 155 communicating as described above with the discharge conduit 130. Conduit 157 is also provided which is connected to a suitable outlet port in the pump 113 and to conduit 156 for bypassing the fluid flowing in conduit 128 when the support frame wheel 66 is not turning.

In the operation of the planting apparatus P, which is moved forwardly by the tractor T, the support frame wheels 66, 67 are rotated with wheel 66 driving the pump 113. Chain 92 is driven by the hydraulic motor 103 to move the plant-carrying arms 101 into a plant-receiving position adjacent the operator on seat 86 on the support frame 46 with the side members 102 of the arms 101 in an open, spaced-apart relationship. This plant-receiving position is shown in FIG. 2 in broken lines and is designated generally by the letter R. The operator manually places a seedling S into the arm 101 in this plant-receiving position and continued movement of the chain 92, in the direction of the arrow C, moves the arm 101 containing the plant or seedling S downwardly so that the arm 101 engages the cam means or spaced sidewalls 60a, 60b of the trough member 60 to move the side members 102 together for gripping the seedling S placed in the arm 101. This plant-holding position is maintained as the chain 92 advances and until the arm 101 emerges from the rear edge of the sidewalls 60a, 60b of the trough member 60.

At the same time, the forward movement of the planting apparatus P moves the coulter 51 into engagement with the earth of the planting area A to form the slot 52, as shown in FIG. 4, the slot 52 being widened by the plow 58 to form a continuous furrow in the planting area A, the sides of which are maintained by the sidewalls 60a, 60b of the trough member 60.

As the plant carrying arm 101 emerges from the rear edges of the sidewalls 60a, 60b, the arm extending downwardly into the furrow, the side members 102 are permitted to expand outwardly releasing the plant or seedling S into the furrow in an upstanding position so that the earth-compacting wheels 19, 20 subsequently return and pack the plowed earth into the furrow around the root portion of the seedling S to plant the seedling in the position as shown in FIG. 2. To insure proper earth-compaction by the wheels 19, 20, the weight-supporting device 18 at the rear end 13 of the planter frame 11 is preferably weighted by one or more suitable weights 156 which may be retained on the device 18 by an upstanding post 157 or the like as shown in FIG. 2.

As the contour of the planting area A varies, the forward end 12 of the planter frame 11 is permitted to pivot freely in a vertical plane by means of the link member 37 pivoting on the pivot pins 36, 38 and, at the same time, any unusual variation in the planting area contour is compensated for by the sliding vertical movement of the coupling 41 on the pin 42 unless the coupling 41 has been secured in a fixed position by means of the bolt 40 and bar 48. If the planting frame 11 is moved upward suddenly, such as might result from a striking of an obstruction by the coulter 51 or plow 58, the frame member portions 14a, 16a pivot downwardly permitting the earth-compacting wheels 19, 20 to remain in their normal operating position.

Through the novel construction of this invention, a planting apparatus has been provided by means of which plants such as tree seedlings may be set into the ground at a high-production rate with the earth packed around the seedling roots in a void-free manner and to the proper extent below the surface of the ground. In addition, the plants are set into the ground in uniformly spaced relationship which may be preset in a simple and easy manner and which is unaffected by the ground speed of the apparatus as determined by the speed of the pulling device or tractor. An outstanding feature of the invention is the ability of the planter to properly set plants regardless of random variations in the contour of the planting area over which the planting apparatus is moved. This ability of the invention to follow the ground contour is accomplished by means of the novel construction of the planter frame incorporated in the invention which permits the planter frame to float freely throughout the planting operation. Furthermore, the weight of an operator, which in prior art planting devices was supported on the planter for manually feeding plants to the planting device, has been eliminated with the operator supported independently of the planter frame in a safe, comfortable manner for properly introducing plants to a plant-setting device on the planter frame. The various operations the planting apparatus of the invention, which include trenching, plant-setting, earth-covering and compacting are performed in a highly efficient manner in ground where the earth may be soft such as in prepared beds or where the earth may be hard such as in unprepared cleared land.

While there has been described what at present is considered to be the preferred embodiment of the invention, it will be understood by those skilled in the art that various changes and modifications may be made therein without departing from the invention.

Having thus described the invention, what is claimed is:

1. Planting apparatus for setting plants into the ground within a striplike planting area and arranged to be moved forwardly by a prime mover such as a tractor or the like comprising, in combination, a planter frame having a front end and a rear end, means for pivotally attaching the front end of said planter frame directly to said prime mover for freely pivotal movement of said front end in a substantially vertical plane during said forward movement, said attaching means including a support frame, a link member pivotally connected at opposite ends to said planter frame front end and to said support frame respectively to permit said planter frame to follow the contour of said planting area independently of said support frame, and means for connecting said support frame to said prime mover, means on said support frame for supporting said support frame on the ground adjacent said planting area for forward movement of said support frame by said prime mover together with said planter frame, earth-compacting means on said planter frame for supporting the rear end of said planter frame on said planting area to thereby permit said freely pivotal movement of aid front end and the following of the contour of said planting area by said planter frame during said forward movement, furrow-forming means supported on said planter frame and said earth-compacting means, a plant-setting device supported on said planter frame between said furrow-forming means and said earth-compacting means, means operatively associated with said planter frame for driving said plant-setting device to successively deposit plants introduced into said plant-setting device into the furrow formed by said furrow-forming means at predetermined intervals along said planting area, said earth-compacting means being arranged to return the earth removed by said furrow-forming means to said furrow and to compact the earth around said set plant in a planted condition and operator-supporting means on said support frame adjacent said plant-setting device to permit an operator on said supporting means to manually introduce plants into said plant-setting device.

2. A planting apparatus in accordance with claim 1 including a vertically extending pin on said support frame, a coupling having a sleeve portion telescopically accommodating said pin for freely slidable, vertical movement of said coupling on said pin and wherein the end of said link member adjacent said support frame is pivotally connected to said coupling to extend the range of said freely pivotal movement of said planter frame front end.

3. A planting apparatus in accordance with claim 2 including means for releasably securing said coupling in a selected vertical position on said pin.

4. A planting apparatus in accordance with claim 1, wherein said furrow-forming means include a downwardly extending, freely rotatable disc coulter mounted on said planter frame adjacent said planter frame front end for forming a continuous, vertically extending slot in the earth of said planting area and a downwardly depending plow mounted on said planter frame between said disc coulter and said earth-compacting means.

5. A planting apparatus in accordance with claim 4 including means for adjusting the vertical position of said disc coulter and said plow.

6. A planting apparatus in accordance with claim 5 including means for supporting said earth-compacting means on said planter frame rear end for freely pivotal, downward movement from a normal, upwardly limited position on said planter frame.

7. A planting apparatus in accordance with claim 1 wherein said support frame is of substantially U-shaped configuration having a pair of frame portions extending rearwardly from said planter frame front end attaching means along opposite sides of said planter frame and in laterally spaced relationship therewith and wherein said operator-supporting means comprises a seat on one of said frame portions for said operator to provide said operator access to said plant-setting device and wherein said supporting means for said support frame includes a wheel having an axle on each of said frame portions.

8. A planting apparatus in accordance with claim 7 wherein said plant-setting device includes an endless chain, a plurality of outwardly projecting, plant-carrying arms mounted on said chain in uniformly spaced, longitudinally extending relationship, said plant-carrying arms including a pair of side members yieldingly urged into an open, spaced-apart relationship, rotatable sprocket means for supporting said chain for continuous advance of said chain together with said plant-carrying arms, and wherein said means for driving said plant-setting device are connected to said sprocket means, cam means on said planter frame engageable with said side members on said plant-carrying arms for moving said side members together into a closed, plant-holding relationship, said arms being movable by said chain sequentially into a plant receiving position adjacent an operator in said seat with said side members in said open, spaced-apart relationship a plant-holding position with said side members in engagement with said cam means and with said side members in said closed, plant-holding relationship and a plant-depositing position disengaged from said cam means and with said side members in said open, spaced-apart relationship for releasing the plant held in said arm and setting said released plant vertically in said furrow for compacting by said earth-compacting means.

9. A planting apparatus in accordance with claim 7 wherein said means for driving said plant-setting device include a hydraulic motor on said planter frame having an output shaft, means for drivably connecting said motor output shaft to said plant-setting device, a hydraulic pump on said support frame having an input shaft, means for drivably connecting said pump input shaft to the axle of one of said support frame wheels, means for supplying a hydraulic fluid to said hydraulic pump, conduit means for conducting pressurized hydraulic fluid from said pump to said motor to drive said plant-setting device at a speed determined by the ground speed of said planting apparatus for setting plants into the planting area in a predetermined, uniformly spaced relationship irrespective of said ground speed.

10. A planting apparatus in accordance with claim 9 including a fluid-pressure-actuated cylinder supported on said support frame, said cylinder having a piston connected to said planter frame for moving said planter frame between a lowered planting position and an elevated traveling position and means including normally closed valve means for communicating said hydraulic fluid supply means selectively with opposite sides of said piston in said cylinder to move said planter frame between said planting and said traveling positions.

11. A planting apparatus in accordance with claim 10 wherein said means for communicating said hydraulic fluid supply means with said cylinder include float control valve means for relieving the pressure of said hydraulic fluid on opposite sides of said piston to permit said piston to float freely in said cylinder.

* * * * *